United States Patent
Allen

[11] 3,782,588
[45] *Jan. 1, 1974

[54] FUEL STORAGE CELL

[76] Inventor: Donn W. Allen, 5730 Bankfield Ave., Culver City, Calif. 90230

[ * ] Notice: The portion of the term of this patent subsequent to Feb. 9, 1988, has been disclaimed.

[22] Filed: Feb. 8, 1971

[21] Appl. No.: 113,408

[52] U.S. Cl. ............. 220/88 R, 156/242, 220/9 F, 220/63 R
[51] Int. Cl. .................. B65d 25/14, B65d 25/34
[58] Field of Search .............. 220/88, 63 A, 9 F, 220/88 R, 88 B, 63 R; 156/242, 78, 160, 161, 78, 242

[56] References Cited
UNITED STATES PATENTS

| | | | |
|---|---|---|---|
| 3,561,639 | 2/1971 | Allen | 220/88 R |
| 3,567,536 | 3/1971 | Wickersham, Jr. | 220/88 X |
| 3,435,946 | 4/1969 | Sobek et al. | 206/46 FC |
| 2,336,885 | 12/1943 | Pepersack | 220/63 A |
| 2,508,906 | 5/1950 | Cunningham et al. | 220/9 A |

FOREIGN PATENTS OR APPLICATIONS
1,460,190  10/1966  France ........................ 220/88 R Primary Examiner—George E. Lowrance
Attorney—Roger A. Marrs

[57] ABSTRACT

The fuel cell disclosed herein includes a shaped, porous core having an approximate 97 percent void which is covered by an impregnated fabric material so as to adhere to the periphery of the core and to seal the fabric material. The covered core or bladder has mounting fixtures adapted to detachably connect the fuel cell to supporting structure.

11 Claims, 8 Drawing Figures

DOWN W. ALLEN
INVENTOR.

PATENTED JAN 1 1974

DONN W. ALLEN
INVENTOR

BY Roger A. Marrs

FUEL STORAGE CELL

CROSS REFERENCE

This application is related to co-pending application entitled "FUEL STORAGE CELL" having Ser. No. 757,598, filed Sept. 5, 1968, now U.S. Pat. No. 3,561,639.

BACKGROUND OF THE INVENTION

1. Field of the Invention

This invention relates to fuel storage devices and, more particularly, to a novel fuel storage cell for containing volatile fuel or petroleum products incorporating a covered and sealed reticulated foam core constituting a low-density barrier adapted to block and absorb potentially explosive energy in fuel cell vapor spaces.

2. Description of the Prior Art

One of the fastest growing sports in the world today is that of vehicle racing with boats, automobiles, motorcycles, aircraft and the like. As modern technological improvements have leaped forward in areas of power plants, fuels, metallurgy and the like, competitive racing has employed vehicles of previously unknown performance incorporating a variety of components which are subjected to extremely high torque levels, parts turning ratios, high forces of kinetic energy absorbtion and extreme load bearing and handling characteristics.

Under the stress of such high vehicle performance during competition, component parts breakdown is often occasioned resulting in explosion, fire, fumes and immediate release of quantities of petroleum products such as oil and gas. Obviously, moving parts turning at a high RPM constitute a particular hazard when parts failure occurs. One of the most vulnerable components of a high performance vehicle is the fuel tank or cell which is employed to store a quantity of volatile fuel for supplying the vehicle power plant. Generally, when a part failure is experienced such as when the engine blower, piston, rods, transmission or the fly wheel are subjected to extremely high internal explosive pressures, fragments moving at ballistic speed develope, endangering both the driver and equipment. Furthermore, accompanying such an explosion is the presence of flames and fumes nourished by the onrushing airstream which is directed into the driver's cockpit of the vehicle. When fire does occur, it generally flashes back to the fuel tank or cell where flame propagation occurs causing the cell or tank to explode. Explosions occur only when flames are generated at high speed wherein the velocity of flames exceeds the point of explosion.

Attempts have been made in the past to provide protection against the effects of fuel cell explosion as well as to provide means for retarding, restricting or avoiding flame propagation within the fuel cell to obviate explosion. Heretofore, it was necessary to send complete drawings and specifications of a particular fuel tank to a manufacturer where the particular fuel cell is custom made and fitted. Obviously, this action requires a great deal of time and orders must be placed in advance. Furthermore, some fuel cells employ a bladder of rubberized material filled with polyurethane foam scraps or remnants that are enclosed in a metal fuel tank which is, of course, tailored to fit each fuel type installation. The foam serves several purposes. It serves as an instant baffle, preventing the fuel from sloshing around in the tank and suddenly changing the vehicle's center of gravity when cornering, braking or violently accelerating. In the case of a tank rupture, the bladder material is much more resistant to splintering and shearing than is the metal tank itself, thereby localizing and minimizing the size of the rupture. If fire occurs and flashes back to the tank, there can be no fire in the tank with its accompanying explosion of the tank since the foam completely inhibits flame propagation.

Although reticulated foam composed of a low-density urethane foam material has been employed in the past, difficulties have been encountered in supporting the foam core within the confines of the metal tank which stem largely from the fact that the severed ends of the foam pieces often scratch, mar or otherwise cause rupture of the surrounding bladder material so that leaks of the volatile fuel occur.

Also, it has been extremely difficult to properly seal the core material so as to prevent fuel loss from occurring due to chemical reaction of the fuel with both the material of the core and/or the material surrounding the core. Several drawbacks have been encountered when conventionally cutting the foam into blocks and afterwards fitting them into a bladder. Cutting the foam increases the chances of slightly shredding the raw edges and depositing material in the fuel filter. When the foam is in pieces or sections, there are just that many more raw edges, in addition to the fact that the fuel tends to shift the foam sections slightly as the fuel moves about in the tank. This action abrades the raw edges of the foam, increasing the likelihood of crumbling and shredding.

SUMMARY OF THE INVENTION

Accordingly, the problems and difficulties encountered with conventional fuel cell construction are obviated by the present invention which provides a novel fuel cell and method of manufacture incorporating a reticulated foam material encased in an impregnated cover composed of fabric material including reinforced corners and end sections whereby an infinite baffle is produced for inhibiting flame propagation and sealing the contents of the cell. The bladder, including the foam core, may be mounted on supporting structure.

The core material is in the form of a shaped block and may be sculptured with internal voids and passageways adapted to insertably accept fuel check valves, fuel lines and the like.

By employing the present invention, fuel cells may be made in stock sizes and to order on relatively short notice. The inventive concept includes fabricating tanks from a single block of foam, cut to a required contoured shape in advance, which is then wrapped in a nylon cloth and impregnated with a polyurethane liquid adapted to cure the cloth to a rubber-like consistency. After covering the one-piece foam block, the nylon cloth is tailored to fit and sewn together over the foam block. The resultant bladder can be made of any number of cloth layers necessary to suit the application. Preferably, a vacuum is drawn on the bladder during impregnation and curing to insure a snug fit and leak-proof cell.

Therefore, it is among the primary objects of the present invention to provide a novel fuel cell and method of construction adapted to be manufactured employing volume production techniques.

Another object of the present invention is to provide a novel fuel cell for storage of a quantity of volatile fuel having improved weight-to-strength characteristics and that is explosion-proof.

Another object of the present invention is to provide an explosion-proof fuel cell for high performance vehicles including a shaped block of open-cellular plastic foam encased in a nylon fabric covering so as to provide a bladder adapted to hold and seal a quantity of volatile fuels therein.

Still another object of the present invention is to provide a novel bladder for a fuel cell wherein the inside surface of the fabric covering secures to the peripheral surfaces of the porous, foamed core.

Yet another object of the present invention is to provide a novel fuel cell incorporating a single, shaped, open-cellular foam block, wrapped in ballistic nylon and treated with elastomer coatings and compounds so as to form a bladder having greater sealing, high strength-to-weight ratios, and resistance to applied loads in shear and tension, than can otherwise be had with conventional fuel cell devices.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENTS

Figure 1:
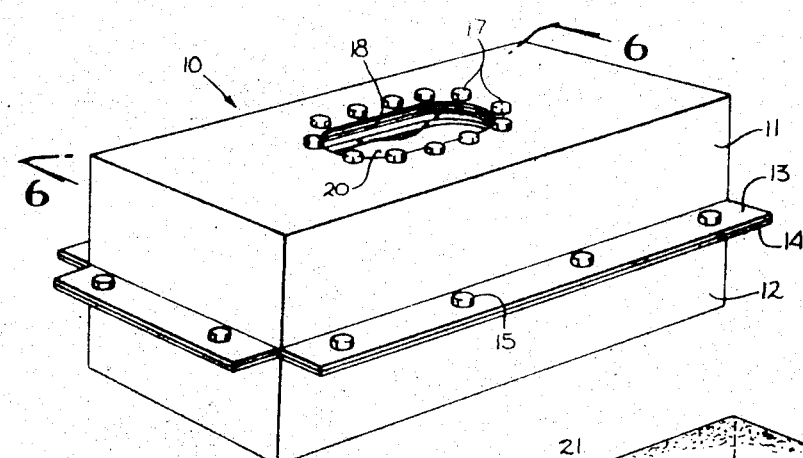
FIG. 1 is a perspective view of the novel fuel cell incorporating the present invention.

Referring to FIG. 1, a novel fuel cell for holding a quantity of volatile fuel is indicated in the general direction of arrow 10 in accordance with the present invention. The fuel cell 10 may include a metal enclosure comprising an upper portion 11 and a lower portion 12. The opposing edges of each of the portions are provided with outwardly extending flanges, as represented by numerals 13 and 14, respectively. However, it is to be understood that the flanges are disposed on the opposite sides as well as the opposite ends of the enclosure. The portions 11 and 12 are releasably secured together by means of a plurality of fasteners, such as bolt 15, which are retained through mating holes in the respective flanges. Although the enclosure is shown as being of rectangular configuration, it is to be understood that any predetermined shape or configuration may be employed depending upon the vehicle and the supporting structure to which the fuel cell is to be mounted.

The upper enclosure portion 11 is formed with an opening 16 exposing the interior of the enclosure so that the interior may readily accept a fuel check valve or the like. In a normal installation, a check valve is generally employed in the fuel system which wholly or partially occupies a portion of the interior of the cell or tank. A plurality of mounting bolts 17 are detachably coupled to the peripheral edge of the upper portion 11 defining the opening 16. The fasteners may be employed to retain an annular coupling ring 18 to the underside of the upper portion edge that defines the opening 16. The annular coupling or ring provides a rigid support for the check valve disposed interiorly of the enclosure. It is to be noted through the opening 16 that the interior of the cell 10 is filled with a core material 20 intended to be immersed in the volatile fuel carried by the fuel cell or tank.

Figure 2:
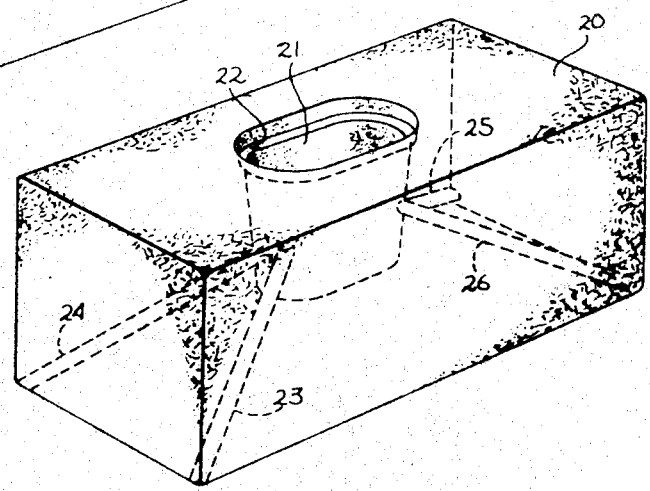
FIG. 2 is a perspective view of a porous core member employed in the fuel cell shown in FIG. 1.

Referring now in detail to FIG. 2, a view of the core material 20 is illustrated wherein the material takes the form of a single block of open cellular foam material composed of an array of polyurethane strands or filaments conventionally sold under the trademark "Safoam". The foam is 97 percent void of volume and occupies no more than 3 percent capacity of the enclosure. It does not substantially increase weight, which is an important factor in aviation applications. The geometry and size of the cells is important. The reticulated structure keeps flame propagation from reaching the velocity necessary for explosion. It dissipates some of the heat generated at ignition and the foam operates as a heat sink so as to provide a cooling action. The skeletal strands break up the compression wave that precedes a flame front in explosion. Furthermore, the skeletal structure absorbs energy from the initial contained explosion. Therefore, the cellular structure absorbs, divides and dissipates energy, whether the energy is thermal or physical compression, heat, or explosion. The structure also provides the foam with an unusual weight-bearing and stress-distributing property.

The reticulated foam is a low-density urethane foam material that is made by a special process in which all membranes have been eliminated from the conventional strand-and-membrane structure. The result is an "open-pore", 3-dimensional skeletal structure of strands which, at a density of 2lb. per cubic foot, provides a constant 97 percent of void space, regardless of pore size. This structure gives the foam a very high degree of permeability. By employing this structure, very close control of pore size is possible which may be measured in pores per linear inch (ppi). In the reticulated foams currently produced, the range extends from 10 to 100 ppi, weighing approximately 1.8 lb. per cubic foot. The two most distinctive characteristics of reticulated foam and the large internal surface areas of the strand structure and the average 97 percent void space in the material.

The foam core block 20 corresponds in shape and configuration to the shape and configuration of the enclosure composed of portions 11 and 12. The foam block 20 is formed with an enlarged recess 21 into which the fuel system check valve may be disposed during installation. A shoulder 22 is also formed in the material of block 20 so as to accommodate the presence of an annular attachment ring or collar 18. A plurality of fuel line passageways, indicated by numerals 23–26 inclusive, are formed in the cellular material of foam block 20 extending between each of the respective lower corners of the block and the recess 21. In an actual installation, the check valve will include fuel lines and tubes or pipelets adapted to be inserted through the passageways 23–26 so that the free end of each fuel line will terminate adjacent a lower corner of the fuel cell.

Figure 3:
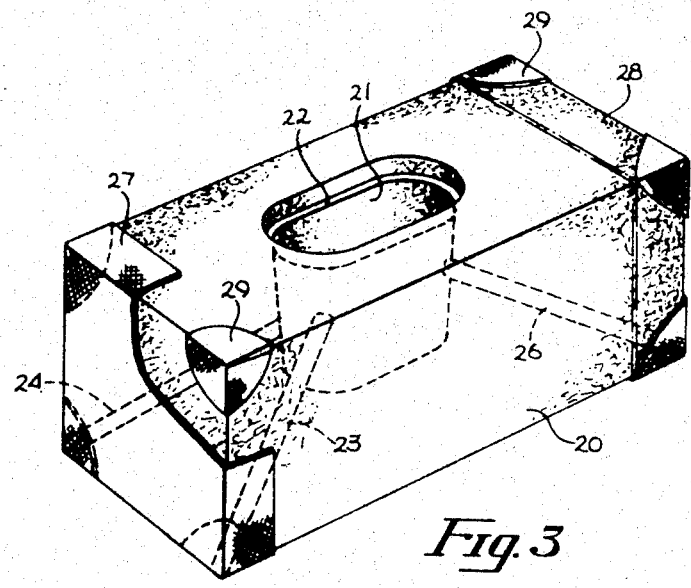
FIG. 3 is a perspective view of the core member shown in FIG. 2 with its opposite ends covered by a fabric material as well as having reinforced corners.

Referring now in detail to FIG. 3, the foam core block 20 is illustrated in its first step of receiving a covering so that a bladder is produced for containing the volatile fuels within the open cellular structure of the block 20. Each corner of the foam block 20 includes a reinforcing element 29 which comprises a build-up of fabric material folded and laid upon itself so as to constitute a doubler or reinforcement member.

Fabric material end pieces 27 and 28 are placed over the opposite ends of the core material, and edge marginal portions of each piece of fabric material are folded over the edges of the block so that the opposite ends of the block and the edge marginal region of the top, bottom and side surfaces are covered. The fabric material end pieces 27 and 28 cover the corner reinforcement elements.

Figure 4:
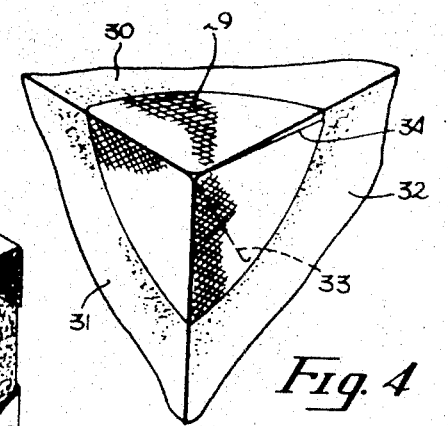
FIG. 4 is an enlarged fragmentary view of a reinforced corner as shown in the broken away portion of the fabric material shown in FIG. 3.

As shown more clearly in FIG. 4, the reinforcing member 29 may be represented by a circular blank of fabric material that is laid flat against surfaces 30 and 31 about their common corner and further laid flat against surface 32 wherein the excess material adjacent side 32 is folded over on itself along fold lines 33 and 34 respectively. The material may be stitched in place for temporary retainment.

Figure 5:
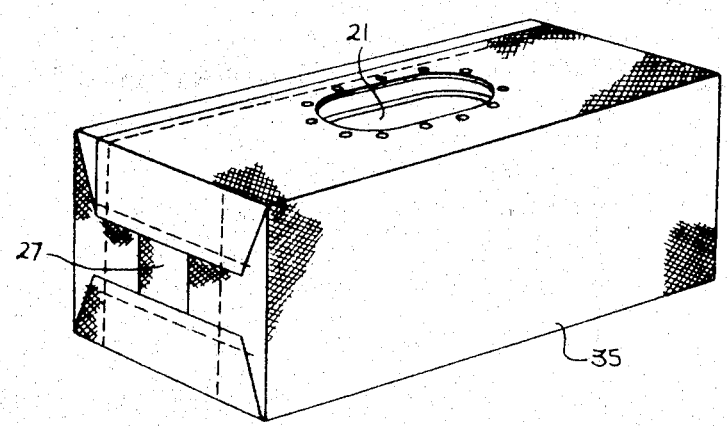
FIG. 5 is a perspective view of the core material completely covered by the fabric material so as to provide an enclosed bladder.

Referring now to FIG. 5, it can be seen that the block 20 including installed end pieces 27 and 28 are covered by a sheet of fabric material 35 which is wrapped about the main body of the block and followed by folding over of the fabric material end at the opposite ends of the block. This construction provides a double fabric thickness at the ends of the block core as well as having all corners reinforced by the reinforcing members 29. The ends of the cover 35 are suitably sewn or otherwise secured so that a complete package or bladder is produced. It is to be understood that the fabric material employed for end pieces 27 and 28, reinforcing member 29, and the wrapped cover 35, are made from ballistic nylon fabric which offers substantial strength in both tension and shear loading conditions.

After the fabric material has been suitably sewn onto the block core 20, the fabric is impregnated with a thin urethane coating which saturates the cloth on both sides thereof so that the cloth fabric secures to the foam core. Preferably, saturation of the cloth is achieved by coating with a polyester urethane elastomer such as is available from the Upjohn Company under the trade name CPR7207 coating. This composition is a solvent system which may either be weighed and mixed by hand and sprayed using standard paint spray apparatus or be sprayed with the use of a two-component metering system. Spraying of the system is simple and the thickness of the material may be easily built up with several coats. Approximately 10 minutes must be allowed between coats so that the solvent may flash off. Material may be sprayed on the fabric surface, as long as it is clean, oil and moisture free.

Next, after the coating of urethane has thoroughly impregnated and contacted the peripheral surfaces of the block 20, the bladder is permitted to cure for approximately 1 hour at 230°F. After curing, the block is secured to the inner wall of the cover fabric and the impregnated fabric presents a pliable yet sealable bladder for containing the volatile fuels therein.

Preferably, once the CPR7207 coating has cured, the outside of the bladder is coated with a permanently flexible, high temperature resistant compound known by those skilled in the art as CS3547 produced by the Chem Seal Corporation of Los Angeles, California. This compound exhibits characteristics of being resistant to abrasion, has high strength, toughness, resilience and chemical resistance. After coating, the compound is cured for approximately 6 hours at 180°F. After the second coating and the curing thereof, clean-up of the bladder takes place and preferably, additional CPR7207 compound is poured through opening 16 into the interior of the bladder where the material is sloshed around so as to thoroughly cover corners of the fabric material.

Figure 6:
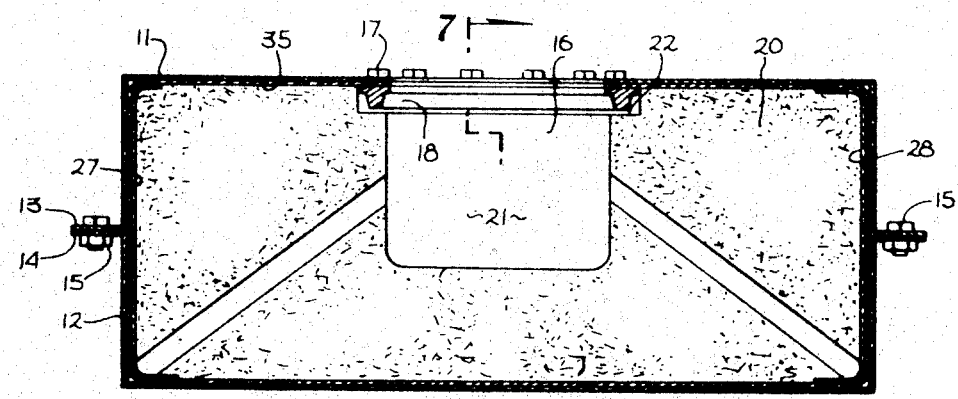
FIG. 6 is a longitudinal cross-sectional view of the fuel cell as taken in the direction of arrows 6—6 of FIG. 1.
Figure 7:
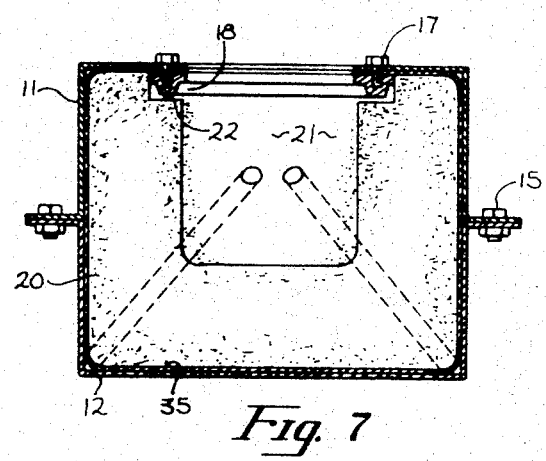
FIG. 7 is a transverse cross-sectional view of the fuel cell shown in FIG. 6 as taken in the direction of arrows 7—7 thereof.

As shown more clearly in FIGS. 6 and 7, the ring 18 occupies an enlargement defined by shoulder 22 and is held on the upper portion 11 of the enclosure by the plurality of fasteners 17. However, it is to be noted that a portion of the cover 35 defining the exterior of the bladder is captured between the under surface of the upper portion 11 adjacent opening 16 and the upper side of ring 18. By this means, uninhibited or unrestricted access into the cavity 21 is maintained and the edge portion of the cover 35 defining opening 16 will not fray or become entangled with other component parts during the installation of the fuel tank in a fuel system. The bladder, represented by the covered core block, is encased in the upper and lower portions 11 and 12 and after mating of flanges in aligned holes formed therein, fasteners 15 may be employed for securing the assembly together.

Figure 8:
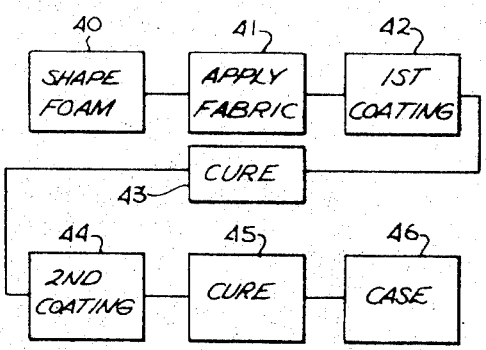
FIG. 8 is a block diagram showing the manufacturing steps employed in producing the fuel cell of the present invention.

Referring now to FIG. 8, it can be seen that the steps for practicing the novel method of the present invention for producing an explosion-proof fuel tank is initiated by first shaping 40 the core material to a desired configuration from a single block of foam followed by applying 41 ballistic nylon as a cover about the core block material. After the cover has been applied, a first coating 42 of CPR7207 compound is applied which thoroughly saturates the fabric material so that the coating compound will cover the inside surface of the fabric in securing contact with the material of the core block. Next, the first coating is permitted to cure 43 in a suitable oven for one hour at 230°F. If an oven cure is not possible, the part may be air cured for 24–36 hours before handling and post cured a minimum of one week at room temperature.

Once the first coating has cured, a second coating 44 of a polyurethane compound such as CS3547 is applied to the exterior surface of the impregnated fabric material and allowed to cure 45 for 6 hours at 180°F. After curing 45 the coating CPR7207 material may be introduced through opening 16 and again applied to the inside surface of the fabric covering 35 so as to achieve a final seal and securement condition with the block core 20. A discretionary step is to enclose 46 the bladder in a metal case after which the unit is ready for installation in a fuel system.

From the foregoing, it can be seen that the novel fuel storage cell of the present invention provides an explosion-proof and leakproof container for holding combustible liquids or gases. The reticulated foam core provides a low-density barrier that blocks and absorbs potentially explosive energy in fuel tank vapor spaces while the coatings of polyether urethane elastomeric compounds applied to the ballistic nylon fabric cover enhance the strength, abrasion resistance, and chemical resistance of the fabric. The compounds, once cured, adequately seal the bladder, and securing adhesion bonds the foam core to the fabric cover.

It is to be understood that the bladder as shown in FIG. 5 may be used without installation within any enclosure. For example, the bladder may be carried directly on the frame of a motorcycle while holding a quantity of fuel. The bladder is rugged and will not rupture under loaded conditions. Therefore, portions 11 and 12 of the case are not a necessary part of the present invention since the bladder provides a satisfactory self-contained and unitary fuel cell structure. The bladder comprises the core, fabric covering including end flaps and the fabric corner members when used. The core may be a single block of open-celled foam or, a plurality of regularly or irregularly shaped blocks, bodies or pieces may be used.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A storage device for holding a quantity of combustible liquid comprising:
   an open-celled core of reticulated material;
   a fabric covering disposed about said core external surface in bonded securement thereto so as to provide an integral and unitary bladder adapted to store the combustible liquid;
   sealant means impregnated in said covering for sealing said bladder against leakage;
   said core having opposite ends; and
   fabric end pieces being secured to said opposite ends immediately beneath said fabric cover.

2. The invention as defined in claim 1 wherein; said fabric covering is composed of ballistic nylon.

3. The invention as defined in claim 1 wherein;
   said core is configured with a plurality of corners; and
   a fabric member is secured to said core at each of said corners beneath said fabric covering and adapted to reinforce said fabric covering at the respective corners of said core.

4. The invention as defined in claim 1 wherein;
   said sealant impregnating means comprises a first coating of plastic-like material saturated in said fabric covering to contact and bond with the peripheral, external surfaces of said core; and
   a second coating of a different plastic-like material from said first coating disposed on the exterior surface of said fabric covering.

5. The invention as defined in claim 4 wherein;
   said first coating is a two component, polyether urethane elastomer.

6. The invention as defined in claim 1 including attachment means carried on said fabric covered bladder for releasable connection to supporting structure.

7. A fuel cell for holding a volatile fuel and adapted to be installed in a fuel system comprising:
   an open-cellular core of reticulated plastic-like material;
   a ballistic nylon fabric covering carried on said core so as to completely envelope said core;
   adhesive means for bonding said core to said covering in a mechanical interlock so that an integral and unitary bladder is produced fully occupied by said core and having a shape corresponding to the shape of said core;
   sealant coating means carried on the exterior surface of said covering operable to effectively seal said bladder against leakage; and
   additional fabric material underlying said fabric covering adjacent said core at critical locations to provide reinforcement.

8. The invention as defined in claim 7 wherein;
   said core is formed with a central recess adapted to receive a component portion of the fuel system; and
   a central opening formed in said covering about said central recess adapted to permit insertion of the component portion into said central recess.

9. The invention as defined in claim 8 including:
   a coupling ring located adjacent said core about said entrance to said central recess and in contact with the edge marginal region of said covering; and
   attachment means securing said ring to said covering.

10. The invention as defined in claim 9 wherein;
    said adhesive means secures said additional fabric material to both said fabric covering and said core.

11. A storage device for holding a quantity of combustible liquid comprising:
    an open-celled core of reticulated material;
    a fabric covering disposed about said core external surface in bonded securement thereto so as to provide an integral and unitary bladder adapted to store the combustible liquid;
    sealant means impregnated in said covering for sealing said bladder against leakage;
    said core being configured with a plurality of corners; and
    a fabric member being secured to said core at each of said corners beneath said fabric covering and adapted to reinforce said fabric covering at the respective corners of said core.

* * * * *